(12) United States Patent
Grossman et al.

(10) Patent No.: US 6,357,900 B1
(45) Date of Patent: Mar. 19, 2002

(54) FASTENER ASSEMBLY FOR ROOF MARKER LAMP

(75) Inventors: Vitaly Grossman, West Bloomfield; David R. Skubik, Clarkston; Thomas A. Vince, Oxford, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/675,104

(22) Filed: Sep. 28, 2000

(51) Int. Cl.[7] .................................................. B60Q 1/24
(52) U.S. Cl. ........................ 362/493; 362/368; 362/457; 362/549
(58) Field of Search ................................ 362/493, 549, 362/496, 546, 368, 457; 24/703.3, 704.1, 704.2

(56) References Cited

U.S. PATENT DOCUMENTS

| | | | |
|---|---|---|---|
| 4,783,110 A | * | 11/1988 | Beukema .................. 296/37.7 |
| 5,175,911 A | * | 1/1993 | Terrels ......................... 24/674 |
| 5,624,266 A | * | 4/1997 | Gibbs ........................... 439/34 |
| 6,220,732 B1 | * | 4/2001 | Paffrath ....................... 362/496 |

\* cited by examiner

*Primary Examiner*—Alan Cariaso
*Assistant Examiner*—Hargobind S. Sawhney
(74) *Attorney, Agent, or Firm*—Jeffery A. Sedlar

(57) ABSTRACT

A fastener assembly for securing a roof marker lamp to a vehicle includes a plurality of fasteners extending through the roof marker lamp. The fastener assembly also includes a plurality of retainers disposed adjacent the roof marker lamp to receive the fasteners for preventing the fasteners from exiting the roof marker lamp and adapted to be snapped into apertures in the roof to secure the roof marker lamp to the roof. The fastener assembly further includes a plurality of slides cooperating with the fasteners and the retainers to pre-assemble the fasteners and the retainers to the roof marker lamp prior to securing the roof marker lamp to the roof.

20 Claims, 3 Drawing Sheets

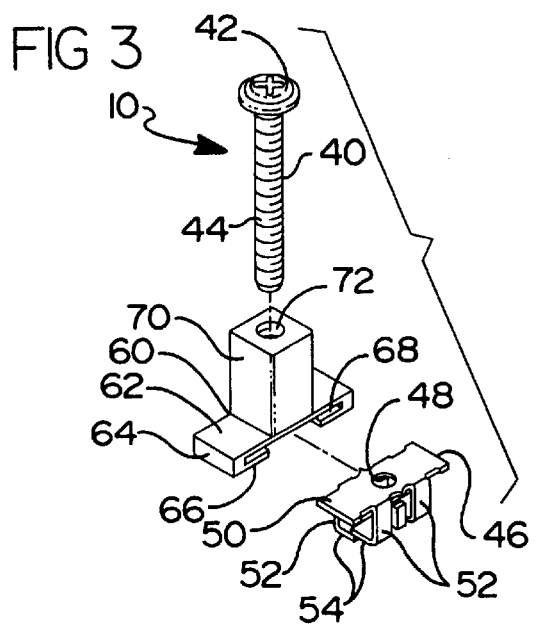
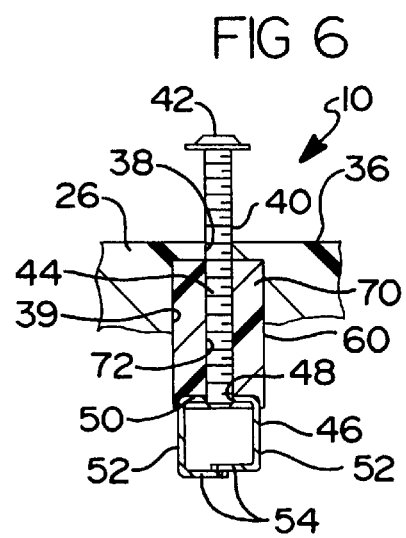
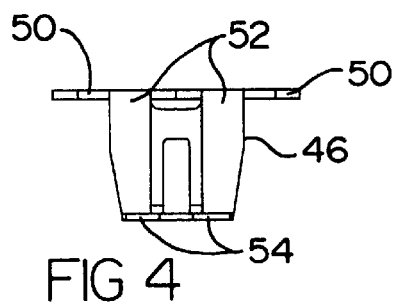
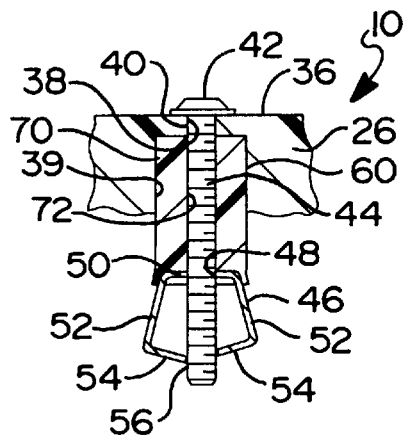
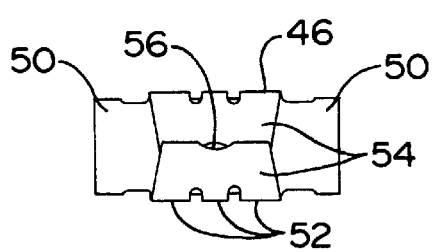

FASTENER ASSEMBLY FOR ROOF MARKER LAMP

TECHNICAL FIELD

The present invention relates generally to fasteners and, more particularly, to a fastener assembly for a roof marker lamp for a vehicle.

BACKGROUND OF THE INVENTION

It is known to provide a roof marker lamp for a vehicle such as a sport utility vehicle or a pick-up truck. Typically, the roof marker lamp is attached to an outer surface of a roof of the vehicle. The roof marker lamp is typically attached to the roof by a plurality of individual screws extending through the roof marker lamp and engaging separate individual nuts, which are disposed in recesses in the roof. However, the separate screws and nuts are loose and do not typically allow the roof lamp marker to be installed or attached to the roof in a required time. In addition, the screws cannot be adequately aligned with the roof lamp marker before conducting a torque procedure.

As a result, it is desirable to provide a new fastener assembly for a roof marker lamp for a vehicle. It is also desirable to provide a fastener assembly that is pre-assembled to a roof marker lamp that snaps-in for installation to the roof of the vehicle. It is further desirable to provide a fastener assembly for a roof marker lamp that aligns the fasteners with the roof marker lamp prior to torquing when installed on the roof of the vehicle. Therefore, there is a need in the art to provide a fastener assembly for a roof marker lamp on a vehicle.

SUMMARY OF THE INVENTION

It is, therefore, one object of the present invention to provide a new fastener assembly for a roof marker lamp for a vehicle.

It is another object of the present invention to provide a fastener assembly for a roof marker lamp that is pre-assembled to the roof marker lamp.

It is yet another object of the present invention to provide a fastener assembly for a roof marker lamp that has an integrated extension to align a fastener with the roof marker lamp.

To achieve the foregoing objects, the present invention is a fastener assembly for securing a roof marker lamp to a vehicle. The fastener assembly includes a plurality of fasteners extending through the roof marker lamp. The fastener assembly also includes a plurality of retainers disposed adjacent the roof marker lamp to receive the fasteners for preventing the fasteners from exiting the roof marker lamp and adapted to be snapped into apertures in the roof to secure the roof marker lamp to the roof. The fastener assembly further includes a plurality of slides cooperating with the fasteners and the retainers to pre-assemble the fasteners and the retainers to the roof marker lamp prior to securing the roof marker lamp to the roof.

One advantage of the present invention is that a new fastener assembly is provided for a roof marker lamp for a vehicle. Another advantage of the present invention is that the fastener assembly links together a fastener and retainer and is pre-assembled to a roof marker lamp to a vehicle. Yet another advantage of the present invention is that the fastener assembly reduces the number of loose pieces in a vehicle assembly plant. Still another advantage of the present invention is that the fastener assembly has an integrated extension to allow alignment of the fastener to the retainer before conducting a torquing procedure so clearance holed for fasteners can be reduced in diameter to prevent leakage. A further advantage of the present invention is that the fastener assembly reduces installation time and improves quality due to adequate sealing.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 3 is an exploded perspective view of the fastener assembly of FIGS. 1 and 2.

FIG. 4 is a front elevational view of a retainer of the fastener assembly of FIG. 3.

FIG. 5 is a bottom plan view of the retainer of the fastener assembly of FIG. 3.

FIG. 6 is a fragmentary elevational view of the fastener assembly of FIG. 3 prior to torquing.

FIG. 7 is a view similar to FIG. 6 illustrating the fastener assembly of FIG. 3 after torquing.

DESCRIPTION OF THE PREFERRED EMBODIMENT

Figure 1:
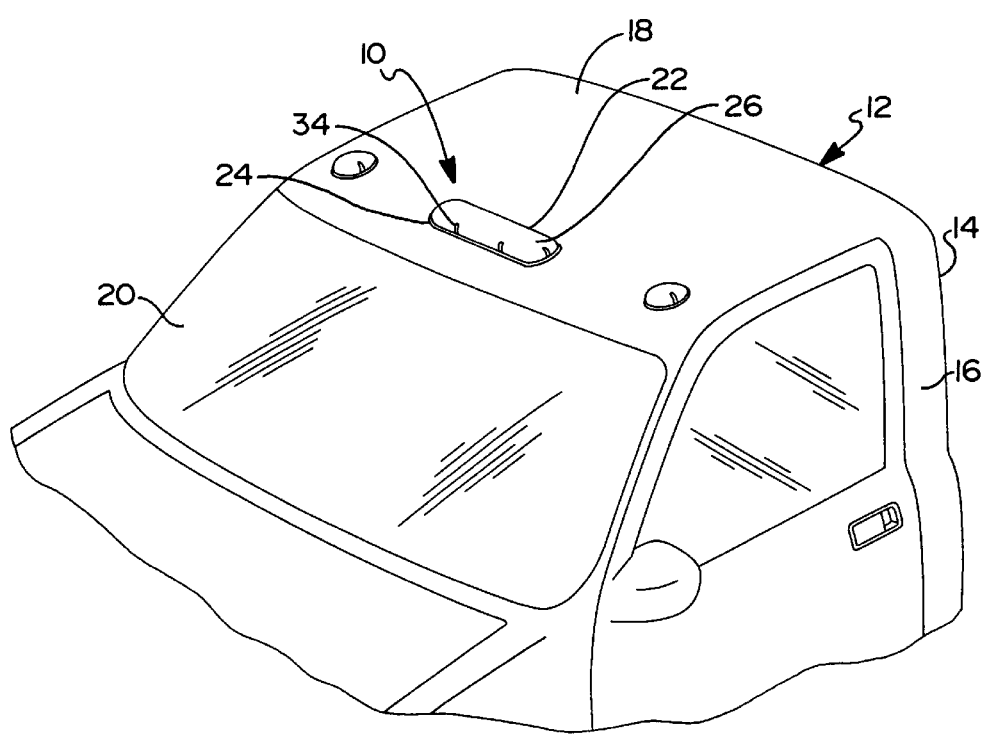
FIG. 1 is a perspective view of a faster assembly, according to the present invention, illustrated in operational relationship with a roof marker lamp of a vehicle.

Referring to the drawings and in particular FIGS. 1 through 7, one embodiment of a fastener assembly 10, according to the present invention, for a roof marker lamp 22 to be described is shown for a vehicle such as a pick-up truck, generally indicated at 12. The vehicle 12 includes a vehicle body 14 forming sides 16 and a roof 18 and including a windshield 20 extending forwardly and downwardly at a front longitudinal end thereof. It should be appreciated that the fastener assembly 10 may be used on other objects than a roof lamp marker. It should also be appreciated that, except for the fastener assembly 10, the vehicle 12 is conventional and known in the art.

Figure 2:
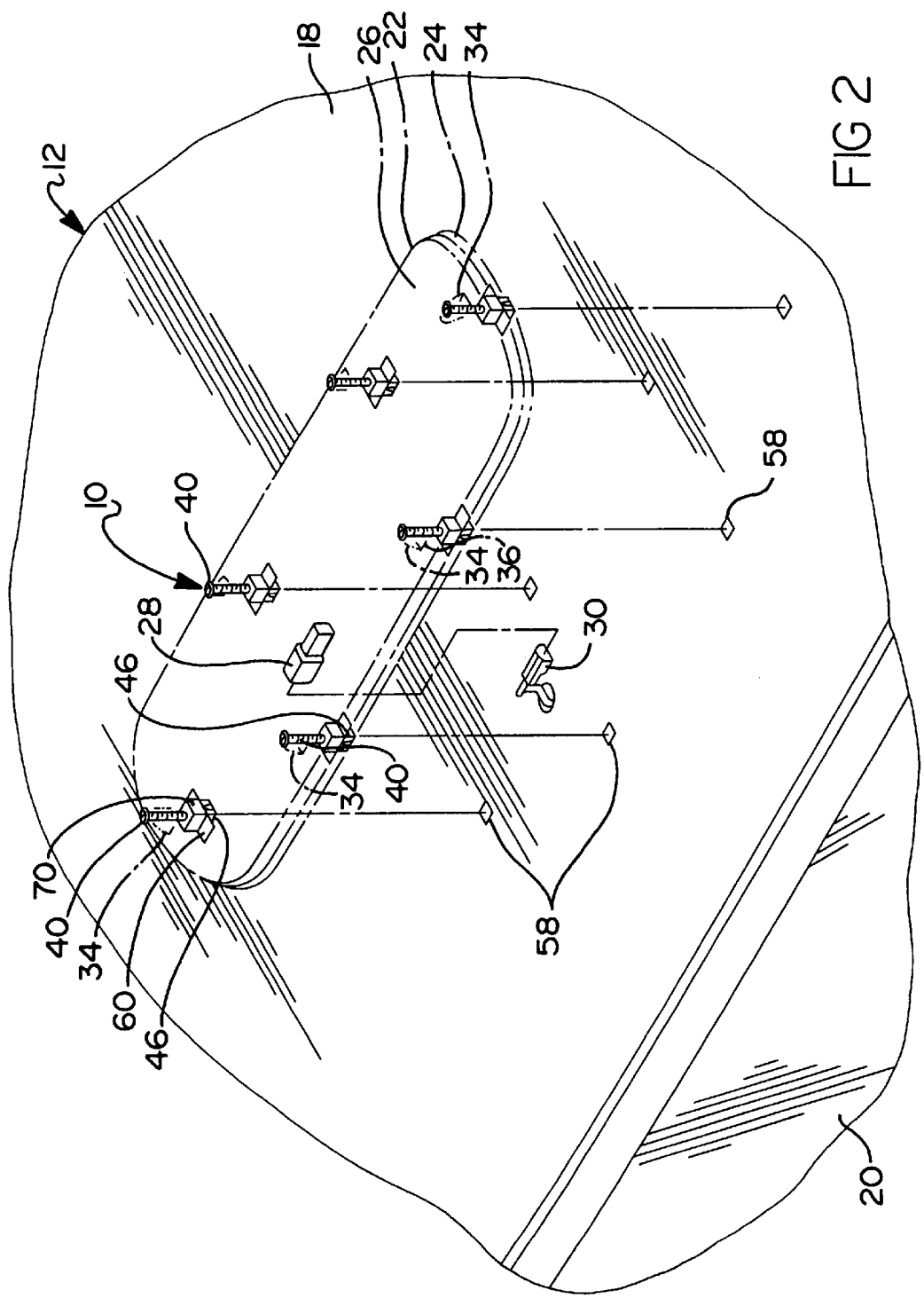
FIG. 2 is an exploded perspective view of the fastener assembly and roof marker lamp of FIG. 1.

Referring to FIGS. 2 and 3, the roof marker lamp 22 is generally rectangular in shape. The roof marker lamp 22 has a base 24 and a lens 26 disposed over the base 24. The base 24 has a bottom surface with a contour that differ from that of the roof 18 so that before the roof marker lamp 22 is secured to the roof 18 only outboard edges of the roof marker lamp 22 tough the roof 18. The base 24 includes a connector 28 for a lamp or bulb (not shown), which is connected to a roof lamp harness connector 30 attached to the roof 18. The base 24 has a plurality of apertures (not shown) spaced along a periphery thereof for a function to be described. The base 24 is made of a rigid material such as a plastic material, preferably polycarbonate. The base 24 includes a seal (not shown) such as a rubber gasket extending around the periphery of the base 24 for engagement with the outer surface of the roof 18. It should be appreciated that the seal is conventional and known in the art.

The lens 26 is generally rectangular in shape and has a generally arcuate or curved cross-sectional shape. The lens 26 is disposed over the base 24 and has a plurality of recesses 34 spaced along a periphery thereof and aligned with the apertures 32 of the base 24. Each of the recesses 34 has a bottom surface 36, which is generally planar and horizontal, and may include a rim (not shown) extending upwardly into the recess 34 and generally perpendicular to the bottom surface 36 for a function to be described. Each of the recesses 34 has an aperture 38 extending through the bottom surface 36 to the base 24. The aperture 38 includes an enlarged cavity or portion 39 adjacent the base 24. The lens 26 is made of a rigid material such as a plastic material, preferably polycarbonate.

The fastener assembly 10, according to the present invention, includes a fastener 40 such as a screw extending through the roof marker lamp 22. The fastener 40 has a head 42 extending radially and a threaded shaft 44 extending axially from the head 42. The fastener 40 is disposed in the recess 34 such that the threaded shaft 44 extends through the aperture in the lens 26 and the aperture in the base 24 and the head 42 abuts the rim. The fasteners 40 are made of a metal material such as steel. It should be appreciated that the threaded shaft 44 is of a sufficient length to extend past the base 24 for a function to be described.

The fastener assembly 10 further includes a retainer 46 disposed adjacent the base 24 and engaging the threaded shaft 44 of the fastener 40 to retain the fastener 40 to the roof marker lamp 22 and the roof 18 of the vehicle 12. The retainer 46 has a threaded aperture 48 extending therethrough to receive the threaded shaft 44 of the fastener 40. The retainer 46 also has a flange 50 extending laterally outwardly and a plurality of legs 52 extending downwardly and generally perpendicular thereto. The retainer 46 also includes a plurality of arms 54 extending inwardly and generally perpendicular to the legs 52. The arms 54 overlap each other and may be integral, unitary, and one-piece on each side thereof. Each of the arms 54 have a generally arcuate recess 56 along a free end thereof for engagement with the threaded shaft 44 of the fastener 40 in a manner to be described. The retainers 46 are of a push-nut type to be disposed in a plurality of, preferably six, apertures 58 extending through the roof 18 to secure the roof marker lamp 22 to the roof 18. The retainers 46 are made of a metal material such as steel.

The fastener assembly 10 further includes a slide 60 cooperating with the retainer 46 and the roof marker lamp 22. The slide 60 is generally rectangular in shape. The slide 60 has a flange 62 extending laterally outwardly and a plurality of legs 64 extending downwardly and generally perpendicular thereto. The slide 60 also includes a plurality of arms 66 extending inwardly and generally perpendicular to the legs 64. The flange 62, legs 64, and arms 66 for a generally rectangular recess 68 for engagement with the flange 50 of the retainer 46 in a manner to be described. The slide 60 may include a projection or extension 70 extending upwardly from the flange 62 and through the aperture in the base 24 to be disposed in the enlarged portion 39 of the aperture 38. The extension 70 has an aperture 72 extending therethrough and communicating with the recess 68 to receive the threaded shaft 44 of the fastener 40. The slide 60 is a monolithic structure being integral, unitary, and one-piece. The slides 60 are made of a plastic material. It should be appreciated that the extension 70 orients the retainer 46 and fastener 40 during assembly of the roof marker lamp 22 onto the roof 18 of the vehicle 12.

In operation of the fastener assembly 10, the lens 26 is disposed over the base 24 of the roof marker lamp 22. The fasteners 40 are disposed in the recesses 34 of the lens 26 with the threaded shafts 44 extending through the aperture 38 of the lens 26 and the aperture 72 of the slide 60 to engage the retainers 46 with the extension 70 being disposed in the enlarged portions 39 of the apertures 38. The fasteners 40 are rotated such that the threaded shafts 44 threadably engage the threaded apertures 48 and recesses 56 of the retainers 46. It should be appreciated that the fastener assembly 10 is pre-assembled to the roof lamp marker 22 before being installed on the vehicle 12.

Once the fastener assembly 10 and roof lamp marker 22 are pre-assembled, the roof marker lamp 22 is disposed adjacent the roof 18 such that the retainers 46 snap into the apertures 58 and engage the roof 18. Before torquing the fasteners 40, the only the outboard edges of the roof marker lamp 22 touch the roof 18. The fasteners 40 are completely torqued one at a time, with the sequence being irrelevant. The extensions 70 mate in the roof marker lamp 22, allowing enough movement to align all retainers 46 with their apertures 58 in the roof 18. In addition, the legs 52 and arms 54 of the retainers 46 move outwardly and expand to engage the roof 18 to secure the roof marker lamp 22 thereto as illustrated in FIG. 7.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fastener assembly for securing a roof marker lamp to a vehicle comprising:

a plurality of fasteners extending through the roof marker lamp;

a plurality of retainers disposed adjacent the roof marker lamp to receive said fasteners for preventing said fasteners from exiting the roof marker lamp and adapted to be snapped into apertures in the roof to secure the roof marker lamp to the roof; and a plurality of slides cooperating with said fasteners and said retainers to pre-assemble said fasteners and said retainers to the roof marker lamp prior to securing the roof marker lamp to the roof.

2. A fastener assembly as set forth in claim 1 wherein each of said slides includes an extension for aligning one of said fasteners with one of said retainers.

3. A fastener assembly as set forth in claim 2 wherein each of said slides has a flange extending outwardly from opposed sides of said extension.

4. A fastener assembly as set forth in claim 3 wherein each of said slides has a leg extending perpendicularly from said flange and an arm extending perpendicularly from said leg to form a recess therebetween to receive a portion of said retainer.

5. A fastener assembly as set forth in claim 4 wherein said extension has an aperture extending therethrough and communicating with said recess.

6. A fastener assembly as set forth in claim 5 wherein said extension, said flange, said leg, and said arm are integral, unitary, and one-piece.

7. A fastener assembly as set forth in claim 4 wherein said each of said retainers has a flange extending outwardly on opposed sides thereof to be received in said recess.

8. A fastener assembly as set forth in claim 4 wherein each of said retainers has at least one leg extending perpendicularly to said flange and an arm extending perpendicularly to said at least one leg.

9. A fastener assembly as set forth in claim 8 wherein said at least one arm includes a second recess for engagement with one of said fasteners.

10. A fastener assembly as set forth in claim 8 each of said fasteners comprises a head and a threaded shaft extending axially from said head to extend through one of said slides and engage one of said retainers.

11. A fastener and roof marker lamp assembly for a vehicle comprising:

a roof marker lamp disposed adjacent a roof of a vehicle;

a plurality of fasteners extending through said roof marker lamp;

a plurality of retainers disposed adjacent said roof marker lamp to receive said fasteners for preventing said fasteners from exiting said roof marker lamp and snapped into apertures in the roof to secure said roof marker lamp to the roof; and a plurality of slides cooperating with said fasteners and said retainers to pre-assemble said fasteners and said retainers to said roof marker lamp prior to securing said roof marker lamp to the roof.

12. A fastener and roof marker lamp assembly as set forth in claim 11 wherein said roof marker lamp comprises a base and a lens disposed over said base.

13. A fastener and roof marker lamp assembly as set forth in claim 12 wherein lens has a plurality of apertures extending therethrough and aligned with the apertures in the roof.

14. A fastener and roof marker lamp assembly as set forth in claim 13 wherein said apertures in said lens have an enlarged portion adjacent said base.

15. A fastener and roof marker lamp assembly as set forth in claim 14 wherein each of said slides includes an extension disposed in said enlarged portion for aligning one of said fasteners with one of said retainers.

16. A fastener and roof marker lamp assembly as set forth in claim 15 wherein each of said slides has a flange extending outwardly from opposed sides of said extension.

17. A fastener and roof marker lamp assembly as set forth in claim 16 wherein each of said slides has a leg extending perpendicularly from said flange and an arm extending perpendicularly from said leg to form a recess therebetween to receive a portion of said retainer.

18. A fastener and roof marker lamp assembly as set forth in claim 17 wherein said extension has an aperture extending therethrough and communicating with said recess.

19. A fastener and roof marker lamp assembly as set forth in claim 18 wherein said extension, said flange, said leg, and said arm are integral, unitary, and one-piece.

20. A roof assembly for a vehicle comprising:

a roof having a plurality of first apertures extending therethrough;

a roof marker lamp comprising a base disposed adjacent said roof and a lens disposed over said base;

said lens includes a plurality of recesses having a bottom surface and a plurality of second apertures, one of said second apertures extending through said bottom surface;

a plurality of fasteners extending through said second apertures;

a plurality of retainers disposed adjacent said roof marker lamp to receive said fasteners for preventing said fasteners from exiting said roof marker lamp and snapped into said first apertures in said roof to secure said roof marker lamp to said roof; and a plurality of slides cooperating with said fasteners and said retainers to pre-assemble said fasteners and said retainers to said roof marker lamp prior to securing said roof marker lamp to said roof.

* * * * *